United States Patent [19]

Tomalia et al.

[11] 4,011,376
[45] Mar. 8, 1977

[54] NOVEL REACTION PRODUCTS OF ALLYL HALIDES OR VINYLBENZYL HALIDES WITH OXAZOLINES (OR OXAZINES)

[75] Inventors: Donald A. Tomalia; Elizabeth A. Zubritsky, both of Midland, Mich.

[73] Assignee: The Dow Chemical Company, Midland, Mich.

[22] Filed: Mar. 3, 1975

[21] Appl. No.: 554,381

[52] U.S. Cl. .................................. 526/11.1; 260/2 R
[51] Int. Cl.² ................. C08G 33/06; C07D 85/36; C08G 33/02; C08G 45/00
[58] Field of Search .................. 260/93.5 R, 93.5 S, 260/2 EN, 2 R

[56] References Cited
UNITED STATES PATENTS

| | | |
|---|---|---|
| 3,373,194 | 3/1968 | Fuhrmann et al. ............... 260/2 EN |
| 3,483,141 | 12/1969 | Litt et al. ............................ 260/2 R |
| 3,562,263 | 2/1971 | Litt et al. ............................ 260/2 R |
| 3,563,920 | 2/1971 | Tomalia et al. ..................... 260/2 R |
| 3,579,630 | 5/1971 | Herz et al. ........................... 260/2 R |

FOREIGN PATENTS OR APPLICATIONS 47-42,984  12/1972  Japan
49-54,498  5/1974  Japan

*Primary Examiner*—Joseph L. Schofer
*Assistant Examiner*—Herbert J. Lilling
*Attorney, Agent, or Firm*—L. Wayne White

[57] ABSTRACT

Novel products corresponding to the formula

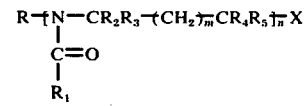

are produced by reacting an allyl halide (e.g., allyl chloride) or a vinylbenzyl halide (e.g., vinylbenzyl chloride) with an oxazoline or an oxazine. The novel compounds are polymerizable monomers and can be used to complex phenols.

10 Claims, No Drawings

NOVEL REACTION PRODUCTS OF ALLYL HALIDES OR VINYLBENZYL HALIDES WITH OXAZOLINES (OR OXAZINES)

BACKGROUND OF THE INVENTION

1. Field of the Invention

The invention pertains to novel polymerizable monomers obtained by reacting an allyl halide or a vinylbenzyl halide with an oxazoline or oxazine.

2. Background of the Invention

Litt et al. teach in U.S. Pat. No. 3,483,141 that oxazolines and oxazines ring open in the presence of alkyl halides (e.g., methyl iodide and 1,4-dibromobutane) and certain other compounds to form useful polyamides.

SUMMARY OF THE INVENTION

We have discovered a novel class of compounds which correspond to the general formula

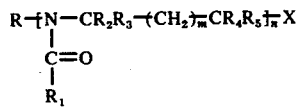

wherein:
- R is allyl or m- and/or p-vinylbenzyl (preferably the latter);
- $R_1$ is hydrogen, alkyl of from 1 to about 24 carbon atoms or phenyl (preferably methyl or ethyl);
- $R_2-R_5$ are each independently hydrogen, lower alkyl or lower-hydroxyalkyl with the proviso that at least two of $R_2-R_5$ are hydrogen (preferably, $R_2$ and $R_3$ are hydrogen, methyl, ethyl or hydroxymethyl and $R_4$ and $R_5$ are hydrogen; most preferably $R_2-R_5$ are each hydrogen);
- m is 0 or 1 (preferably 0);
- n is an integer of at least 1 (preferably from 1 to about 10); and
- X is a terminal organic group.

The novel compounds are polymerizable monomers which are useful in complexing phenolics in addition to being useful as coatings.

The instant compounds are much more versatile than the polyamides described by Litt et al. due to the polymerizable terminal group present as an allyl or a vinylbenzyl moiety.

DETAIL DESCRIPTION OF THE INVENTION

As noted above, the instant products are prepared by reacting an allyl halide or a m- and/or p-vinylbenzyl halide with an oxazoline or oxazine monomer. By halide is here meant chloride, bromide or iodide. The allyl chloride and vinylbenzyl chlorides are the preferred species due to the current commercial availability of same. The reaction may be conducted neat but it is preferably conducted in the presence of an inert liquid reaction medium as a convenient means of controlling the temperature and facilitating contact of the reactants. Suitable such inert liquids include acetonitrile, methylene chloride, dimethyl formamide, and other like solvents which are inert in the process. The reaction may be conducted at any convenient temperature which promotes reaction between the reactants but we normally prefer to use a temperature of from about 80° to about 100° C. Additionally, we normally prefer to add small but catalytic amounts of iodide ion to further facilitate the reaction.

The reactants used in the above process are known classes of reactants and include allyl chloride, allyl bromide, allyl iodide, m- and/or p-vinylbenzyl chloride, vinylbenzyl bromide, and vinylbenzyl iodide. The oxazoline and oxazine reactants are likewise a well known class of compounds with correspond to the general formula

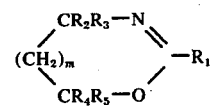

wherein $R-R_5$ and m are as defined above. The oxazoline reactants (i.e., $m=0$) are the best known and thus preferred. OF these, 2-methyl and 2-ethyl-2-oxazoline are the most preferred reactants for use herein. The examples of suitable such oxazolines and oxazines include those of Formula II above having the following values for R and $R_1-R_5$.

TABLE I

| $R_1$ | $R_2$ | $R_3$ | $R_4$ | $R_5$ | m |
|---|---|---|---|---|---|
| H | H | H | H | H | 0 |
| H | $CH_2OH$ | $CH_2OH$ | H | H | 0 |
| $CH_3$ | H | H | H | H | 0 |
| $CH_3$ | $CH_3$ | $CH_3$ | H | H | 0 |
| $C_2H_5$ | $CH_2OH$ | $CH_2OH$ | H | H | 0 |
| $C_2H_5$ | H | H | $CH_3$ | H | 0 |
| $C_4H_9$ | H | H | $CH_3$ | $CH_3$ | 0 |
| $C_{12}H_{25}$ | H | H | H | H | 0 |
| $C_{18}H_{37}$ | H | H | H | H | 0 |
| $C_6H_5$ | H | H | H | H | 0 |
| $C_6H_5$ | $CH_2OH$ | H | H | $CH_3$ | 0 |

Likewise suitable are the corresponding compounds wherein m is 1 and other like compounds falling within the definition of II.

The following examples will further illustrate the invention:

EXAMPLE 1

A commercial mixture of meta and paravinylbenzyl chlorides (6.59 g; 0.043 mol), sodium iodide (0.65 g; 0.0043 mol), 2-ethyl-2-oxazoline (42.6 g; 0.043 mol) and N,N'-diphenyl-p-phenylenediamine (0.05 g) and acetonitrile (50 g) were charged to a reaction vessel equipped with a mechanical stirrer, a heating means, and condenser. The reaction mixture was heated at 90° C for seven hours with continuous stirring. Analysis of the reaction mixture by vapor phase chromatography (VPC) showed that approximately 95 percent or more of the 2-ethyl-2-oxazoline had been consumed. The mixture was heated at 90° C for an additional seven hours and the resulting orange liquid was cooled. Sodium chloride was filtered from the orange liquid leaving a clear-orange solution. The acetonitrile solvent was stripped away from this orange solution under reduced pressure leaving the desired reaction product as a yellow solid. The product was redissolved in chloroform and precipitated in diethyl ether. The yellow product thus obtained was soluble in water, chloroform, methylene chloride and tetrahydrofuran. Further analysis of the product by nuclear magnetic resonance spectroscopy and infrared spectroscopy indicated that the structure of the product was consistent with Formula I above. The product had a number average molecular weight of 1,134; a total iodide concentration of 1.18 weight percent; and a total chloride concentration of 2.9 weight percent. The number average molecular weight was determined by conventional gel permeation chromatography technique using a linear polystyrene of known molecular weight as the standard. The iodide and chloride concentrations were determined by neutron activation.

EXAMPLE 2

A similar reaction was run using the same commercial mixture of m- and/or p-vinylbenzyl chlorides (9.56 g), sodium iodide (10.42 g), 2-ethyl-2-oxazoline (31.03 g) and N,N'-diphenyl-p-phenylenediamine (0.05 g). Here, however, the reactants were sealed in a bottle and rotated at 90° C water bath for 9 hours and cooled. Following a similar workup, the product was obtained having a similar nuclear magnetic resonance spectrum as Example 1 but having a number average molecular weight of 630.

EXAMPLE 3

Vinylbenzyl iodide (0.01 mol), 2-methyl-5,6-dihydro-1,3-4-H-oxazine (0.01 mol) and N,N'-dipenyl-p-phenylenediamine (0.0012 g) were sealed in a bottle and rotated for one hour at 90° C in a water bath. The light-yellow glass-like solid thus obtained was dissolved in methylene chloride and precipitated in diethyl ether thus giving the desired product as a light yellow, powdery material which appeared to be almost hydroscopic in nature. The product had a number average molecular weight of 917 and its structure was confirmed by nuclear magnetic resonance spectroscopy and infrared spectroscopy. The product was insoluble in tetrahydrofuran.

EXAMPLE 4

Vinylbenzyl iodide (0.244 g) and 2-ethyl-2-oxazoline (9.9 g) plus a minor amount of the phenylenediamine inhibitor were sealed in a bottle and rotated in a water bath at 91° C for 14.5 hours. The resulting yellow glassy product was pulverized and dried under vacuum at 34° C for 20 hours. The product thus obtained had solubility parameters and a nuclear magnetic resonance spectrum essentially the same as that obtained in Example 1. The product had a number average molecular weight of 3,940 and a total iodide concentration of 1.23 weight percent.

The products produced above are polymerized by the use of conventional free radical initiators and can be further crosslinked by using crosslinking monomers such as divinylbenzene. The products produced from Examples 1 through 4 above can be used per se or can be cross-linked with divinylbenzene, for example, and used to complex phenols in solutions. This property makes the instant compounds useful in removing contaminating amounts of phenols from waste streams. The instant products can also be dissolved in methylene chloride and cast as films which can be subsequently cured to form protective coatings.

We claim:
1. A methylene chloride-soluble composition of matter corresponding to the formula

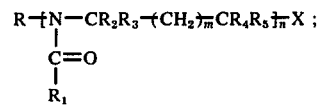

wherein
R is allyl or m- and/or p-vinylbenzyl
$R_1$ is hydrogen, alkyl of 1 to 24 carbon atoms or phenyl;
$R_2$–$R_5$ are hydrogen, lower alkyl or lower-hydroxyalkyl with the proviso that at least two of $R_2$–$R_5$ are hydrogen;
m is 0 or 1;
n is an integer of at least 1; and
X Chloro bromo iodo or hydroxy.

2. The composition of matter defined by claim 1 wherein $R_1$ is methyl or ethyl.

3. The composition of matter defined by claim 1 wherein $R_2$ and $R_3$ are hydrogen, methyl, ethyl or hydroxymethyl and $R_4$ and $R_5$ are each hydrogen.

4. The composition of mattter defined by claim 3 wherein $R_2$ and $R_3$ are each hydrogen.

5. The composition of matter defined by claim 1 wherein m is 0.

6. The composition of matter defined by claim 1 wherein n is an integer of from 1 to 5.

7. The composition of mattter defined by claim 2 wherein R is m- and/or p-vinylbenzyl; $R_2$ and $R_3$ are hydrogen, methyl, ethyl or hydroxymethyl; $R_4$ and $R_5$ are each hydrogen; m is 0; and n is an integer of from 1 to 5.

8. The composition of matter defined by claim 7 wherein $R_2$ and $R_3$ are each hydrogen.

9. The composition of matter defined by claim 1 which is produced by reacting (a) allyl chloride, bromide or iodide or m-and/or p-vinylbenzyl chloride, bromide or iodide with (b) an oxazoline or oxazine of the formula

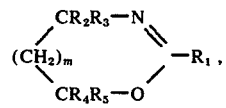

wherein
$R_1$ is hydrogen, alkyl of 1 to 24 carbon atoms or phenyl;
$R_2$–$R_5$ are hydrogen, lower alkyl or lower-hydroxyalkyl with the proviso that at least two of $R_2$–$R_5$ are hydrogen; and
m is 0 or 1.

10. The reaction product defined by claim 9 wherein (a) is m- and/or p-vinylbenzyl chloride (b) is 2-methyl-2-ethyl-2-oxazoline.

* * * * *

UNITED STATES PATENT AND TRADEMARK OFFICE
CERTIFICATE OF CORRECTION

PATENT NO. : 4,011,376
DATED : March 8, 1977
INVENTOR(S) : Donald A. Tomalia and Elizabeth A. Zubritsky It is certified that error appears in the above-identified patent and that said Letters Patent are hereby corrected as shown below:

Column 2, line 8: "with" should read --which--.

Column 2, line 19: "OF" should read --Of--.

Column 2, line 26: "Rl" should read --$R_1$--.

Column 3, line 24: "1,3-4-H" should read -- 1,3-4H --.

Column 3, line 24: "N,N'-dipenyl-p-" should read -- N,N'-diphenyl-p- --.

Column 4, line 20, Claim 1, line 13: "X Chloro bromo iodo or hydroxy" should read --X is chloro, bromo, or iodo.--.

Column 4, line 59: --or-- should be inserted before "2-ethyl-2-oxazoline.--.

Signed and Sealed this nineteenth Day of July 1977

[SEAL]

Attest:

RUTH C. MASON
Attesting Officer

C. MARSHALL DANN
Commissioner of Patents and Trademarks